United States Patent
Kachler

(10) Patent No.: US 10,201,862 B2
(45) Date of Patent: Feb. 12, 2019

(54) CUTTING TOOL HAVING A COOLANT CHAMBER WITH AN INTEGRALLY FORMED COOLANT DEFLECTION PORTION AND TOOL BODY

(71) Applicant: Iscar, Ltd., Tefen (IL)

(72) Inventor: Ilan Kachler, Carmiel (IL)

(73) Assignee: Iscar, Ltd., Tefen (IL)

( * ) Notice: Subject to any disclaimer, the term of this patent is extended or adjusted under 35 U.S.C. 154(b) by 45 days.

(21) Appl. No.: 15/651,494

(22) Filed: Jul. 17, 2017

(65) Prior Publication Data

US 2018/0065196 A1     Mar. 8, 2018

Related U.S. Application Data

(60) Provisional application No. 62/384,350, filed on Sep. 7, 2016.

(51) Int. Cl.
    *B23C 5/28*          (2006.01)
    *B23B 27/10*        (2006.01)
    *B23C 5/10*         (2006.01)

(52) U.S. Cl.
    CPC ............... *B23C 5/28* (2013.01); *B23B 27/10* (2013.01); *B23C 5/109* (2013.01);
(Continued)

(58) Field of Classification Search
    CPC . B23B 2250/12; B23B 27/10; B23C 2250/12; B23C 5/28; B23C 2205/04; B23C 2210/165; B23C 5/109
    See application file for complete search history.

(56) References Cited

U.S. PATENT DOCUMENTS 5,775,854 A    7/1998   Wertheim
8,845,242 B2   9/2014   Schuffenhauer et al.
(Continued)

FOREIGN PATENT DOCUMENTS

CH             708238 A2 * 12/2014 ............... B23C 5/06
DE    102013105015      11/2013
(Continued)

OTHER PUBLICATIONS

International Search Report dated Nov. 8, 2017, issued in PCT counterpart application (No. PCT/IL2017/050955).
(Continued)

*Primary Examiner* — Sara Addisu
(74) *Attorney, Agent, or Firm* — Womble Bond Dickinson (US) LLP

(57) ABSTRACT

A cutting tool includes a replaceable cutting insert and a tool body. The tool body includes a tool body surface and an insert pocket recessed therein. The cutting insert is releasably retained in the insert pocket. The tool body includes at least one coolant duct that has an outlet orifice that opens out in a coolant chamber. The coolant chamber is bounded on a side opposite the outlet orifice by a coolant deflection portion that is integrally formed with the tool body in a unitary one-piece construction and at least partially overhangs the outlet orifice in a direction towards the insert pocket. The coolant deflection portion has a chamber deflection surface configured to deflect a coolant in the direction of a cutting edge of a cutting insert seated in insert pocket.

25 Claims, 4 Drawing Sheets

(52) U.S. Cl.
CPC ....... *B23B 2205/04* (2013.01); *B23B 2250/12* (2013.01); *B23C 2210/165* (2013.01); *B23C 2250/12* (2013.01)

(56) References Cited

U.S. PATENT DOCUMENTS

| | | |
|---|---|---|
| 8,946,585 B2 | 2/2015 | Kappmeyer |
| 9,289,836 B2 | 3/2016 | Koifman et al. |
| 9,925,596 B2 * | 3/2018 | Johansson ............. B23B 27/143 |
| 2007/0283786 A1 | 12/2007 | Kappmeyer |
| 2008/0124180 A1 * | 5/2008 | Breisch ................... B23B 27/10 |
| | | 407/110 |
| 2011/0020073 A1 * | 1/2011 | Chen ....................... B23B 27/10 |
| | | 407/11 |
| 2016/0175938 A1 | 6/2016 | Kaufmann |
| 2016/0339523 A1 | 11/2016 | Graf et al. |

FOREIGN PATENT DOCUMENTS

| | | | |
|---|---|---|---|
| FR | 1115922 A | 5/1956 | |
| JP | 10076404 A * | 3/1998 | ............. B23B 27/10 |
| JP | 2003053621 A * | 2/2003 | ............... B23C 5/28 |
| WO | WO 2016/117461 A1 | 7/2016 | |

OTHER PUBLICATIONS

Written Opinion dated Nov. 8, 2017, issued in PCT counterpart application (No. PCT/IL2017/050955).

* cited by examiner

CUTTING TOOL HAVING A COOLANT CHAMBER WITH AN INTEGRALLY FORMED COOLANT DEFLECTION PORTION AND TOOL BODY

RELATED APPLICATIONS

The present application claims priority to U.S. Provisional application No. 62/384,350, filed Sep. 7, 2016. The contents of the aforementioned application are incorporated by reference in their entirety.

FIELD OF THE INVENTION

The subject matter of the present application relates to cutting tools of the type in which a cutting insert is releasably retained in an insert pocket of a tool body. More particularly, this application relates to such cutting tools having a cooling mechanism.

BACKGROUND OF THE INVENTION

Cutting tools having a cutting insert releasably retained in an insert pocket of a tool body can be provided with a cooling mechanism. The cooling mechanism can be provided by one or more coolant ducts, having coolant outlets, for conveying coolant fluid to a cutting portion of cutting insert. An example of such a cutting tool is disclosed in, for example, U.S. Pat. No. 9,289,836 B2, where the coolant outlet is located rotationally forward of the cutting insert. Another example is CH 708 238 A2, where the coolant outlet is formed with a separate distributing element. The tool bodies of such cutting tools are made from steel and are manufactured by traditional methods such as, for example, turning, milling and drilling. The coolant ducts are created during a post manufacturing process by drilling a hole from the outside of the tool body.

Alternatively the tool body can be manufactured by newer techniques, such as Additive Manufacturing. Additive Manufacturing refers to a class of manufacturing processes, in which a part is built by adding layers of material upon one another. This allows, in the case of tool bodies, the coolant ducts to be created at the same time the tool body is manufactured. This permits the coolant ducts to have an unusual structure (e.g. a non-circular cross-section) that is not limited as in the older techniques mentioned above. It also allows the coolant ducts to be curved. An example of such a cutting tool is disclosed in, for example, U.S. Pat. No. 8,946,585 B2.

SUMMARY OF THE INVENTION

In accordance with a first aspect of the subject matter of the present application there is provided a cutting tool having a central tool axis extending in a forward direction to a rearward direction, the cutting tool comprising:
  a tool body comprising a tool body surface and an insert pocket recessed therein; and
  a cutting insert releasably retained in the insert pocket, wherein:
    the tool body comprises:
      a coolant chamber that opens out to the tool body surface at a coolant chamber opening; and
      at least one coolant duct that opens out at an outlet orifice in the coolant chamber; and
      the coolant chamber is bounded on a side opposite the outlet orifice by a coolant deflection portion that is integrally formed with the tool body in a unitary one-piece construction and at least partially overhangs the outlet orifice in a direction towards the insert pocket.

In accordance with a second aspect of the subject matter of the present application, there is also provided a cutting tool having a central tool axis extending in a forward direction to a rearward direction, the cutting tool comprising:
  a tool body comprising a tool body surface and an insert pocket recessed therein; and
  a cutting insert releasably retained in the insert pocket, wherein:
    the tool body comprises:
      a coolant chamber that opens out to the tool body surface at a coolant chamber opening;
      at least one coolant duct that opens out at an outlet orifice in the coolant chamber;
      the coolant chamber is bounded on a side opposite the outlet orifice by a coolant deflection portion that is integrally formed with the tool body in a unitary one-piece construction; and
      in a front view of the coolant chamber, the outlet orifice is at least partially hidden by the coolant deflection portion.

In accordance with a third aspect of the subject matter of the present application, there is also provided a tool body comprising a tool body surface and an insert pocket for seating a cutting insert, recessed therein; wherein:
  the tool body comprises:
    a coolant chamber that opens out to the tool body surface at a coolant chamber opening; and
    at least one coolant duct that opens out at an outlet orifice in the coolant chamber; wherein:
      the coolant chamber is bounded on a side opposite the outlet orifice by a coolant deflection portion that is integrally formed with the tool body in a unitary one-piece construction and at least partially overhangs the outlet orifice in a direction towards the insert pocket.

In accordance with a fourth aspect of the subject matter of the present application, there is also provide a cutting tool having a central tool axis extending in a forward direction to a rearward direction, the cutting tool comprising:
  the tool body of the type described above; and
  a cutting insert seated in the insert pocket of the tool body.

In accordance with a fifth aspect of the subject matter of the present application, there is also provide a method of delivering coolant during a cutting operation, comprising:
  providing the cutting tool of the type described above, and
  emitting an elongated sheet of coolant through the coolant chamber opening, such that the coolant travels over and along a relief surface of the cutting insert and impacts at a juncture between a cutting edge of the insert and a workpiece.

It is understood that the above-said is a summary, and that features described hereinafter may be applicable in any combination to the subject matter of the present application, for example, any of the following features may be applicable to the cutting tool:

The coolant deflection portion can completely overhang the outlet orifice.

The coolant chamber can be recessed in the tool body surface so that the coolant deflection portion does not protrude from the tool body surface.

The coolant chamber opening can be spaced apart from the insert pocket.

The outlet orifice can be generally circular.

The coolant chamber can be formed peripherally by a chamber deflection surface and a chamber orifice surface that oppose each other and two opposing chamber minor surfaces which connect the chamber deflection surface and the chamber orifice surface. The chamber deflection surface can be located on the coolant deflection portion. The outlet orifice can be located on the chamber orifice surface.

The chamber deflection surface and the chamber orifice surface can be planar. The two chamber minor surfaces can be are concavely curved.

The outlet orifice can define an outlet orifice plane. The outlet orifice can have an outlet orifice axis which is perpendicular to the outlet orifice plane. The chamber deflection surface can form a chamber deflection angle with the outlet orifice axis. The chamber deflection angle can be in the range $90° < \beta < 130°$.

The chamber orifice surface can be parallel to the outlet orifice plane.

The coolant chamber can extend along a chamber central axis that passes between the chamber deflection surface, the chamber orifice surface and the chamber minor surfaces. As measured in a cross-sectional plane perpendicular to the chamber central axis, the coolant chamber can have an increasing cross-section, in a direction towards the coolant chamber opening.

The coolant chamber can extend along a chamber central axis. In a cross sectional plane perpendicular to the chamber central axis, the chamber deflection surface and the chamber orifice surface can be longer than the two chamber minor surfaces.

The cutting insert can comprise a cutting edge. The coolant chamber opening can have an elongated shape extending longitudinally generally in the same direction as the cutting edge.

The length of coolant chamber opening can be at least 50% the length of the cutting edge.

The tool body can comprise exactly two coolant ducts.

The insert pocket can comprise a pocket base surface and a threaded bore opening out thereto. The two coolant ducts can extend on either side of the threaded bore.

The cutting tool can be configured to rotate in a direction of rotation around the central tool axis. The tool body can comprise a forward facing body face surface and a body periphery surface, the body periphery surface extending circumferentially along the central tool axis and forming a boundary of the body face surface at a forward end of the cutting tool. The coolant chamber opening can be located rotationally behind the insert pocket.

The coolant chamber opening and the insert pocket can be aligned in the circumferential direction of the cutting tool.

The cutting tool can be configured to rotate in a direction of rotation around the central tool axis. The tool body can comprise a forward facing body face surface and a body periphery surface, the body periphery surface extending circumferentially along the central tool axis and forming a boundary of the body face surface at a forward end of the cutting tool. The insert pocket can open out to the body face surface. The coolant chamber opening can be angularly aligned with the insert pocket about the central tool axis.

The cutting tool can be a rotary milling cutter.

The tool body can comprise a forward facing body face surface and a body periphery surface, the body periphery surface extending circumferentially along the central tool axis and forming a boundary of the body face surface at a forward end of the cutting tool. The insert pocket can open out to the body face surface. The coolant chamber opening can be located underneath the insert pocket. The cutting tool can be a turning tool not configured to rotate around the central tool axis.

The coolant chamber opening can be elongated and non-circular.

The cutting insert can have a cutting edge which extends along the tool central axis in the forward-to-rearward direction. The coolant chamber opening can extend longitudinally generally in the same direction as the cutting edge. The coolant chamber opening can be positioned, relative to the insert pocket, so as to direct a coolant over and along a relief surface associated with the cutting edge such that the coolant impacts a juncture between the cutting edge and a workpiece being cut by the cutting tool.

BRIEF DESCRIPTION OF THE FIGURES

For a better understanding of the present application and to show how the same may be carried out in practice, reference will now be made to the accompanying drawings, in which.

Figure 1:
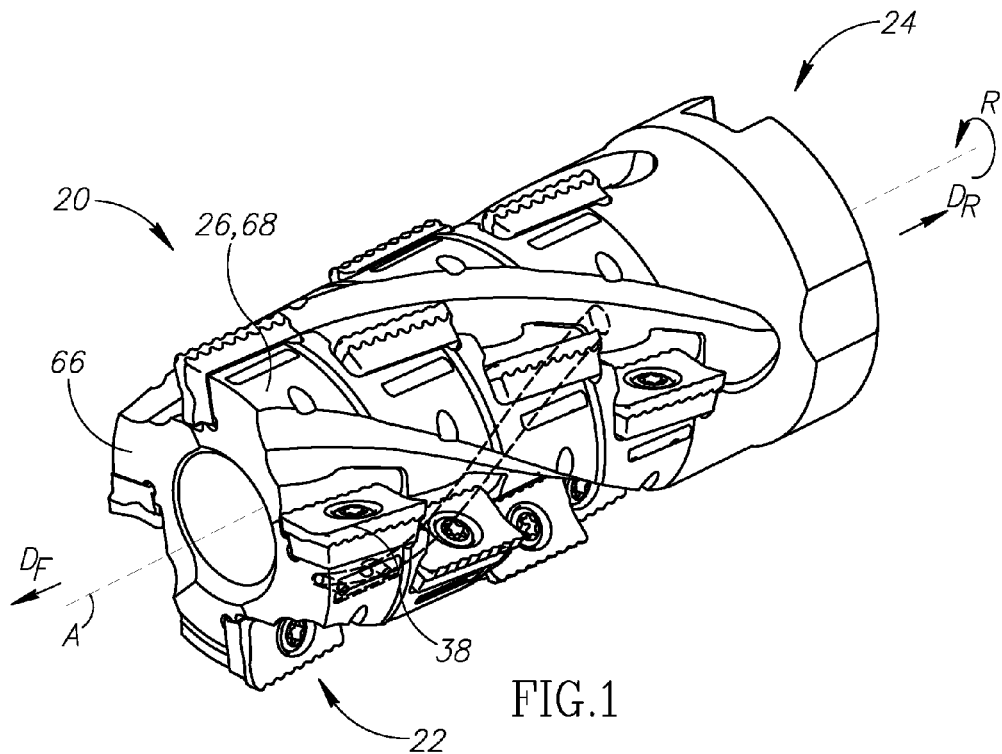
FIG. 1 is a perspective view of a cutting tool.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 2:
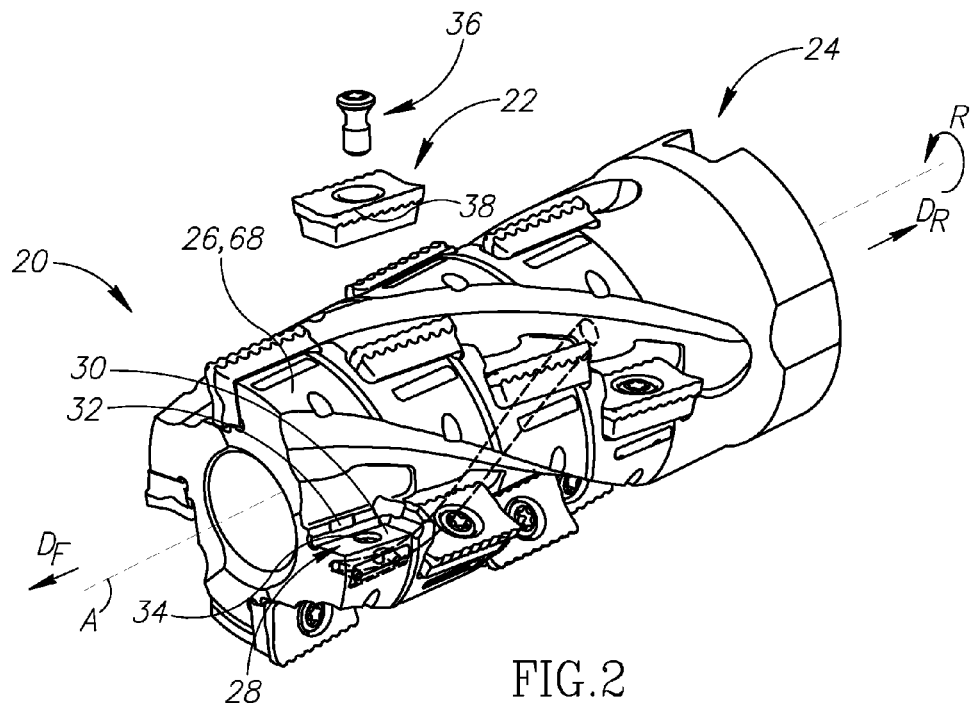
FIG. 2 is an exploded perspective view of the cutting tool in FIG. 1.

Attention is first drawn to FIGS. 1 and 2 showing a cutting tool 20, for chip removal, in accordance with embodiments of the subject matter of the present application. The cutting tool 20 has a cutting insert 22 which can be typically made from cemented carbide. The cutting tool 20 also has a tool body 24 which can be typically made from steel and is manufactured by an Additive Manufacturing process. In this non-limiting example shown in the drawings, the Additive Manufacturing process used is Direct Metal Laser Sintering. However, other Additive Manufacturing techniques can be used.

In this non-limiting example shown in the drawings, the cutting tool 20 is a rotary milling cutter. It is noted, however, that the subject matter of the present application also applies to other types of cutting tools, for example, but not limited to, turning tools. The cutting tool 20 is adjustable between a released and fastened position. In the fastened position of the cutting tool 20, the cutting insert 22 is releasably attached to the tool body 24.

The tool body 24 includes a tool body surface 26. The tool body 24 includes an insert pocket 28, for retaining (i.e. seating) a cutting insert 22 therein. The insert pocket 28 is recessed in the tool body surface 26. It is understood that the term "recessed" when used in respect to an element related to the tool body 24 refers to a structure that is created during the additive manufacturing of the tool body 24, and not in a post manufacturing machining process. In accordance with some embodiments of the subject matter of the present application, the insert pocket 28 can include a pocket base surface 30 and a pocket side surface 32 oriented transversely thereto. The insert pocket 28 can include a threaded bore 34 that opens out to the pocket base surface 30. The threaded bore 34 is for threadingly engaging a retaining screw 36 as described in the description hereinafter.

Figure 3:
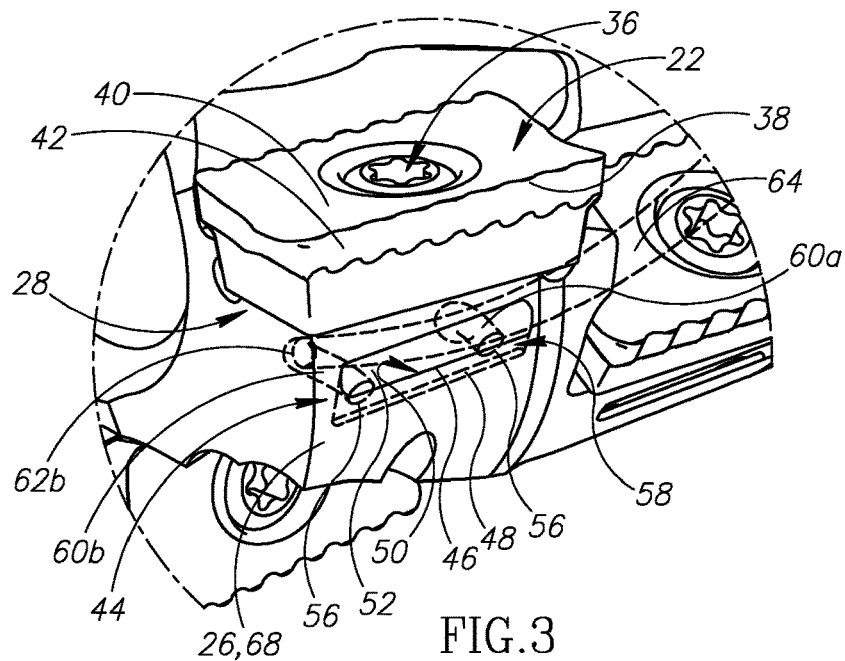
FIG. 3 is a detail of FIG. 1.

The cutting insert 22 has a cutting edge 38 formed at the intersection of a rake surface 40 and a relief surface 42. Reference is now made to FIG. 3, showing a detail of FIG. 1, where the cutting insert 22 is releasably retained in an insert pocket 28 of the tool body 24. In this non-limiting example shown in the drawings, the retaining screw 36 is used to clamp the cutting insert 22 in the insert pocket 28 of the tool body 24 through a through bore. However, other clamping methods may be used. It is noted that the cutting insert 22 and the seating thereof in the insert pocket 28 is known in the field of metal cutting and is not part of the invention.

Figure 4:
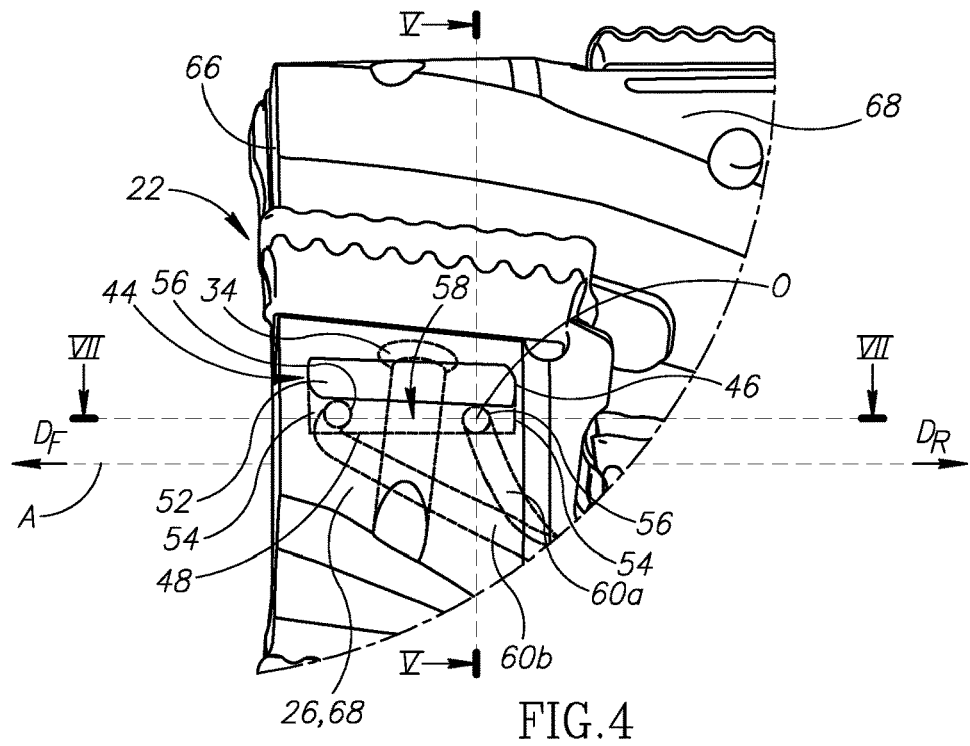
FIG. 4 is a front view of a coolant chamber.

Referring now to FIGS. 3 and 4, the tool body 24 includes a coolant chamber 44 that opens out to the tool body surface 26 at a coolant chamber opening 46. The coolant chamber 44 can be closed at the end opposite the coolant chamber opening 46 by a chamber end surface 48. The coolant chamber is designed to direct coolant fluid towards the cutting edge 38 of the cutting insert 22 with which it is associated. The coolant fluid can be, for example a liquid, such as oil-based or chemical coolants or a gas, such as air. The coolant chamber 44 can extend along a chamber central axis C. The chamber central axis C can pass between the chamber deflection surface 50, the chamber orifice surface 52 and the chamber minor surfaces 54. The chamber central axis C can pass through the coolant chamber opening 46 and intersect the chamber end surface 48. In accordance with some embodiments of the subject matter of the present application, the coolant chamber opening 46 can have an edge that extends smoothly, i.e. with no jagged portions, around its periphery.

As seen in FIG. 4, in a front view of the coolant chamber 44 (defined later in the description) the coolant chamber opening 46 can have a generally rectangular shape. The coolant chamber opening 46 can be spaced apart from the insert pocket 28 by an opening distance D. The value of the opening distance D can vary along the length coolant chamber opening 46. The optimal value of the opening distance D is determined by several factors. One such factor is the desire for the coolant fluid to avoid the base of the cutting insert 22 (which may protrude from the insert pocket 28) when it exits from the coolant chamber opening 46. The opening distance D is ideally less than 5 mm.

Figure 6:
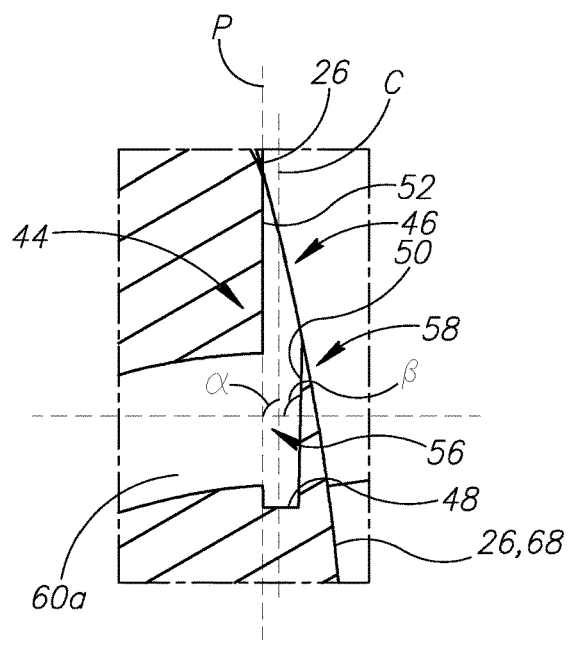
FIG. 6 is a detail of FIG. 5.
Figure 7:
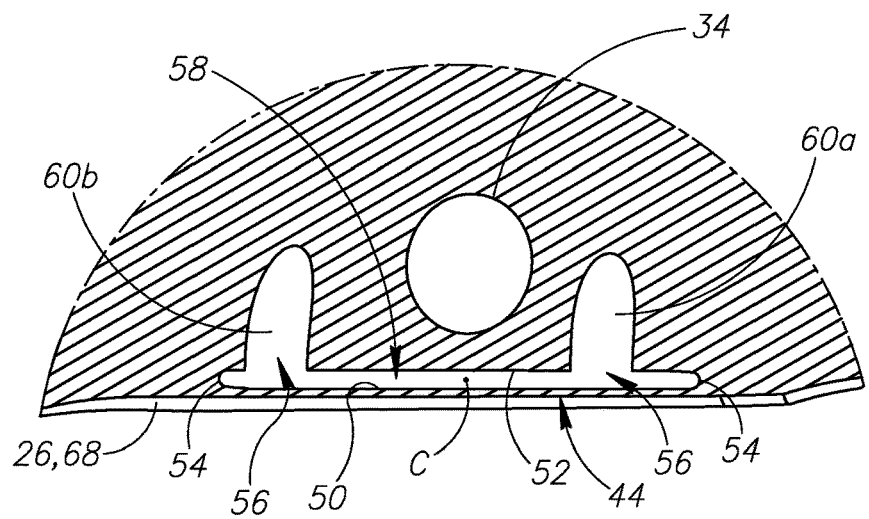
FIG. 7 is a cross sectional view taken along line VII-VII in FIG. 4.

As seen in FIGS. 4 and 6, the coolant chamber opening 46 can have an elongated shape. The coolant chamber opening 46 can extend longitudinally generally in the same direction as the cutting edge 38. In this non-limiting example shown in the drawings, e.g. FIG. 4, the coolant chamber opening 46 is oriented approximately at a 5° angle with respect to the cutting edge 38, so that the opening distance D decreases uniformly. The length of coolant chamber opening 46 can be at least 50% the length of the cutting edge 38. Advantageously, this allows at least a majority of the length of the cutting edge 38 to receive coolant fluid. Due to its elongated, non-circular shape, the coolant chamber opening 46 is configured to supply a stream of coolant having a non-circular cross-section.

In accordance with some embodiments of the subject matter of the present application, the coolant chamber 44 can be formed peripherally by a chamber deflection surface 50 and a chamber orifice surface 52 that oppose each other and two opposing chamber minor surfaces 54. The two opposing chamber minor surfaces 54 can each connect the chamber deflection surface 50 and the chamber orifice surface 52. The chamber deflection surface 50 and the chamber orifice surface 52 can be planar. The chamber minor surfaces 54 can be concavely curved. In a cross sectional plane perpendicular to the chamber central axis C, the chamber deflection surface 50 and the chamber orifice surface 52 can be longer than the two chamber minor surfaces 54.

Figure 5:
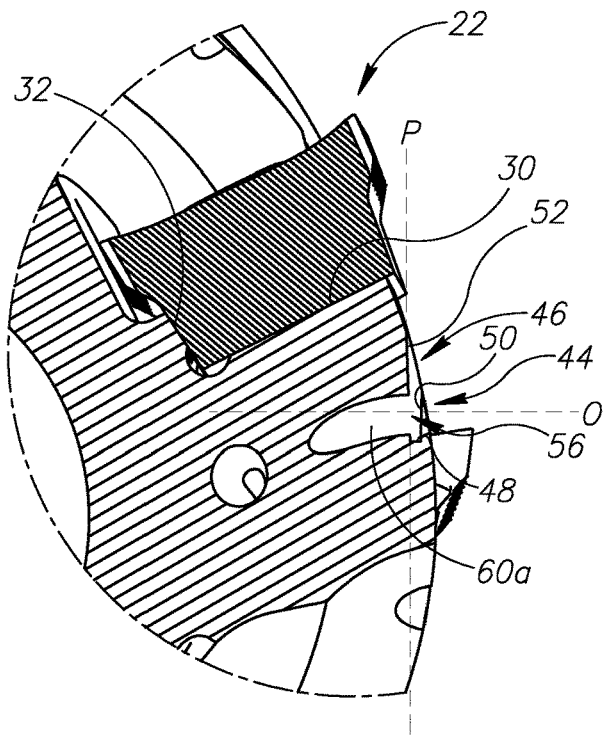
FIG. 5 is a cross-sectional view taken along line V-V in FIG. 4.

The chamber orifice surface 52 includes an outlet orifice 56 whose purpose is described in detail later in the description. The chamber deflection surface 50 is located on a coolant deflection portion 58, which is integrally formed with the tool body 24. That is to say, the coolant deflection portion 58 is connected to the tool body surface 26 and has unitary one-piece construction therewith. Thus, the coolant chamber 44 is bounded on a side opposite the outlet orifice 56 by the coolant deflection portion 58. As can be seen in FIGS. 5 and 6, the coolant chamber 44 can be recessed in the tool body surface 26 so that the coolant deflection portion 58 does not protrude from the tool body surface 26. The coolant deflection portion 58, or more specifically, the chamber deflection surface 50 serves to deflect the coolant fluid, after exiting the outlet orifice 56 under pressure, towards the cutting edge 38 of the cutting insert 22.

Due to its elongated shape, the coolant chamber opening 46, is configured to eject a jet of coolant having a non-circular cross-section. Furthermore, the elongated, non-circular shape of the coolant chamber opening 46 and the chamber deflection surface 50, together are configured to direct a coolant over and along a relief surface associated with the cutting edge 38 such that the coolant impacts a juncture between the cutting edge 38 and a workpiece being cut by the cutting tool 20. This results in emitting an elongated sheet of coolant through the coolant chamber opening 46, such that the coolant travels over and along a relief surface of the cutting insert 22 and impacts at a juncture between a cutting edge 38 of the insert and a workpiece.

The tool body 24 includes at least one coolant duct 60a, 60b. The at least one coolant duct 60a, 60b acts for conveying coolant fluid to the cutting insert 22 via the coolant chamber 44. In accordance with some embodiments of the subject matter of the present application, the tool body 24 can include exactly two coolant ducts, a first and second coolant duct 60a, 60b. Advantageously, this increases the amount of coolant fluid entering the coolant chamber 44. In such a configuration the two coolant ducts 60a, 60b can extend on either side of the threaded bore 34. It is understood that the coolant deflection portion 58 can be located completely outside of the at least one coolant duct 60a, 60b. In the description hereinafter references are made to one coolant duct 60a but it is understood that the tool body 24 in accordance with the subject matter of the present application can include more than one coolant duct, where the number of coolant ducts 60a, 60b is limited by the space on the inner surfaces of the coolant chamber 44.

The coolant duct 60a extends between an inlet orifice 62a and the outlet orifice 56. The inlet orifice 62a is in fluid communication with a coolant source that supplies coolant fluid (not shown). The cooling fluid enters the coolant duct 60a at the inlet orifice 62a, flows along the coolant duct 60a and exits at the outlet orifice 56. In this non-limiting example shown in the drawings, the coolant duct 60a is in fluid communication with a central coolant duct 64 and the inlet orifice 62a is located at the central coolant duct 64. Likewise, when there are two coolant ducts 60a, 60b, the second coolant duct 60b is in fluid communication with the central coolant duct 64 at a second inlet orifice 62b located at the central coolant duct 64. The coolant duct 60a opens out (terminates) in the coolant chamber 44, forming the outlet orifice 56. Stated differently, the coolant duct 60a intersects the coolant chamber 44 to form the outlet orifice 56. The coolant duct 60a has a cross-section that can increase in size as it approaches the coolant chamber 44.

In accordance with some embodiments of the subject matter of the present application, the outlet orifice 56 can be generally circular. The outlet orifice 56 can be located on the chamber orifice surface 52. The outlet orifice 56 defines an outlet orifice plane P. All points on the outlet orifice 56 can be contained in the outlet orifice plane P. The outlet orifice 56 has an outlet orifice axis O which is perpendicular to the outlet orifice plane P. The coolant deflection portion 58 at least partially overhangs the outlet orifice 56 in a direction towards the insert pocket 28. Specifically, in a front view of the coolant chamber 44, the outlet orifice 56 is at least partially hidden by the coolant deflection portion 58. It should be appreciated that a front view of the coolant chamber 44 is defined as one taken in front of the coolant chamber 44 in a direction along the outlet orifice axis O. As seen in FIG. 4, the coolant deflection portion 58 can completely overhang the outlet orifice 56. In such a configuration, as shown in FIG. 6, the outlet orifice axis O can intersect the coolant deflection portion 58.

In accordance with some embodiments of the subject matter of the present application, the chamber deflection surface 50 can form an external chamber deflection angle β with the outlet orifice axis O. The chamber deflection angle β can be in the range 90°<β<130°. The chamber orifice surface 52 can be parallel to the outlet orifice plane P (i.e. form a 90° angle with the outlet orifice axis O). Thus, the chamber deflection surface 50 and the chamber orifice surface 52 can taper away each other in a direction towards the coolant chamber opening 46. In a similar fashion the two chamber minor surfaces 54 can also taper away from each other in a direction towards the coolant chamber opening 46. Thus, as seen in FIG. 6, as measured in a cross-sectional plane perpendicular to the chamber central axis C, the coolant chamber 44 can have an increasing cross-section, in a direction towards the coolant chamber opening 46. Advantageously, the said tapering is intended so that the coolant fluid also has an increasing cross-section as it exits and increases in distance away from the coolant chamber opening 46. The chamber central axis C can form a chamber axis angle α with the outlet orifice axis O. The chamber axis angle α can be in the range 90°<α<110°. As seen in FIG. 6, the chamber orifice surface 52 can form an obtuse internal angle with the tool body surface 26. The chamber deflection surface 50 can form an acute internal angle with the tool body surface 26.

In the configuration when the cutting tool 20 is a rotary cutting tool, for example a milling cutter, the cutting tool 20 has a central tool axis A around which the cutting tool 20 rotates in a direction of rotation R. The central tool axis A extends in a forward $D_F$ to rearward direction $D_R$. The tool body 24 includes a forward facing body face surface 66 and a body periphery surface 68. The body periphery surface 68 extends circumferentially along the central tool axis A and forms a boundary of the body face surface 66 at a forward end of the cutting tool 20. The central tool axis A can intersect the body face surface 66. The cutting tool 20 can include one or more axial rows of insert pockets 28, seating cutting inserts 22, where each cutting insert 22 has an associated at least one coolant chamber 44.

It should be appreciated that use of the terms "forward" and "rearward" throughout the description and claims refer to a relative position in a direction of the central tool axis A towards the left and right, respectively, in FIG. 4.

Figure 8:
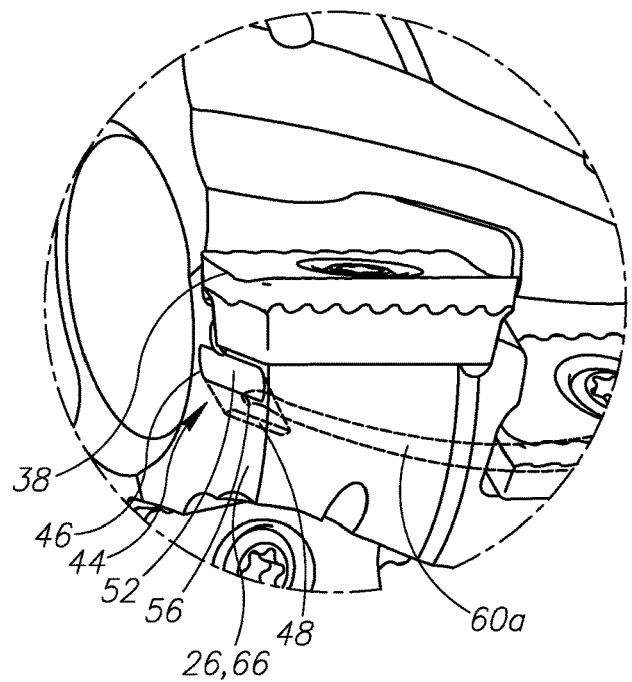
FIG. 8 is an analogous view of FIG. 3, showing a second embodiment of the present invention.

In accordance with one embodiment of the subject matter of the present application, the body periphery surface 68 constitutes the tool body surface 26. In this embodiment, the cutting edge 38 is the cutting edge furthest from the central tool axis A. The coolant chamber opening 46 can be located rotationally behind the insert pocket 28. Moreover, the coolant chamber opening 46 and the insert pocket 28 can be aligned in the circumferential direction of the cutting tool 20. As seen in FIG. 8, in accordance with another embodiment of the subject matter of the present application, the body face surface 66 constitutes the tool body surface 26. The insert pocket 28 can open out to body face surface 66 at a forward end of the cutting tool 20. In this embodiment, the cutting edge 38 is the axially forwardmost cutting edge. The coolant chamber opening 46 is angularly aligned with the insert pocket 28 about the central tool axis A. In both these embodiments the coolant fluid reaches the cutting edge 38 in a direction from the relief surface 42 as opposed to traditionally the rake surface 40 (as shown in U.S. Pat. No. 9,289,836). Advantageously this means the coolant fluid is not obstructed by metal chips produced by the metal cutting operation. It should be understood that the cutting inserts 22 seated in insert pockets 28 in an axial forwardmost row of insert pockets 28 can be associated with coolant chambers 44 in accordance with both embodiments.

In the configuration when the cutting tool 20 is a turning tool, the cutting tool 20 has a central tool axis A, about which the cutting tool 20 is not configured to rotate. The central tool axis A extends in a forward $D_F$ to rearward direction $D_R$. The tool body 24 includes a forward facing body face surface 66 and a body periphery surface 68. The body periphery surface 68 extends circumferentially along the central tool axis A and forms a boundary of the body face surface 66 at a forward end of the cutting tool 20. The central tool axis A can intersect the body face surface 66. In accordance with this embodiment of the subject matter of the present application, the body face surface 66 constitutes the tool body surface 26. The insert pocket 28 can open out to body face surface 66 at a forward end of the cutting tool 20. The cutting edge 38 is the axially forwardmost cutting edge. The coolant chamber opening 46 is located underneath the insert pocket 28.

It should be noted that one feature of the subject matter of the present application is that since the coolant deflection portion 58 is integrally formed with the too body 24 in a unitary one-piece construction there is no need to assemble the tool body 24 after manufacture.

It should also be noted that the coolant fluid, as it leaves the coolant chamber 44, takes the form of the coolant chamber opening 46. Thus, from a single coolant duct 60a, for example, a large volume of coolant fluid can be conveyed towards the cutting insert 22.

It should also be further noted that it is technically impossible to manufacture a cutting tool in accordance the subject matter of the present application, by using traditional (i.e. non Additive Manufacturing) methods, since the chamber deflection portion would obstruct the drilling of the coolant duct.

Although the subject matter of the present application has been described to a certain degree of particularity, it should be understood that various alterations and modifications could be made without departing from the spirit or scope of the invention as hereinafter claimed.

What is claimed is:

1. A cutting tool (20) having a central tool axis (A) extending in a forward direction ($D_F$) to a rearward direction ($D_R$), the cutting tool comprising:
    a tool body (24) comprising a tool body surface (26) and an insert pocket (28) recessed therein; and
    a cutting insert (22) releasably retained in the insert pocket (28), wherein:
    the tool body (24) comprises:
        a coolant chamber (44) that opens out to the tool body surface (26) at a coolant chamber opening (46); and
        at least one coolant duct (60a, 60b) that opens out at an outlet orifice (56) in the coolant chamber (44); and:
        the coolant chamber (44) is bounded on a side opposite the outlet orifice (56) by a coolant deflection portion (58) that is integrally formed with the tool body (24) in a unitary one-piece construction and at least partially overhangs the outlet orifice (56) in a direction towards the insert pocket (28).

2. The cutting tool (20), according to claim 1, wherein the coolant deflection portion (58) completely overhangs the outlet orifice (56).

3. The cutting tool (20), according to claim 1, wherein the coolant chamber (44) is recessed in the tool body surface (26) so that the coolant deflection portion (58) does not protrude from the tool body surface (26).

4. The cutting tool (20), according to claim 1, wherein the coolant chamber opening (46) is spaced apart from the insert pocket (28).

5. The cutting tool (20), according to claim 1, wherein the outlet orifice (56) is generally circular.

6. The cutting tool (20), according to claim 1, wherein:
    the coolant chamber (44) is formed peripherally by a chamber deflection surface (50) and a chamber orifice surface (52) that oppose each other and two opposing chamber minor surfaces (54) which connect the chamber deflection surface (50) and the chamber orifice surface (52);
    the chamber deflection surface (50) is located on the coolant deflection portion (58); and
    the outlet orifice (56) is located on the chamber orifice surface (52).

7. The cutting tool (20), according to claim 6, wherein:
    the chamber deflection surface (50) and the chamber orifice surface (52) are planar; and
    the two chamber minor surfaces (54) are concavely curved.

8. The cutting tool (20), according to claim 6, wherein:
    the outlet orifice (56) defines an outlet orifice plane (P);
    the outlet orifice (56) has an outlet orifice axis (O) which is perpendicular to the outlet orifice plane (P);
    the chamber deflection surface (50) forms a chamber deflection angle (β) with the outlet orifice axis (O); and
    the chamber deflection angle (β) is in the range 90°<β<130°.

9. The cutting tool (20), according to claim 8, wherein the chamber orifice surface (52) is parallel to the outlet orifice plane (P).

10. The cutting tool (20), according to claim 6, wherein:
    the coolant chamber (44) extends along a chamber central axis (C) that passes between the chamber deflection surface (50), the chamber orifice surface (52) and the chamber minor surfaces (54); and
    as measured in a cross-sectional plane perpendicular to the chamber central axis (C), the coolant chamber (44) has an increasing cross-section, in a direction towards the coolant chamber opening (46).

11. The cutting tool (20), according to claim 6, wherein:
    the coolant chamber (44) extends along a chamber central axis (C); and
    in a cross sectional plane perpendicular to the chamber central axis (C), the chamber deflection surface (50) and the chamber orifice surface (52) are longer than the two chamber minor surfaces (54).

12. The cutting tool (20), according to claim 11, wherein:
    the cutting insert (22) comprises a cutting edge (38); and
    the coolant chamber opening (46) has an elongated shape extending longitudinally generally in the same direction as the cutting edge (38).

13. The cutting tool (20), according to claim 12, wherein the length of the coolant chamber opening (46) is at least 50% the length of the cutting edge (38).

14. The cutting tool (20), according to claim 1, wherein exactly two coolant ducts (60a, 60b) open out at the outlet orifice (56) in the coolant chamber (44).

15. The cutting tool (20), according to claim 14, wherein:
    the insert pocket (28) comprises a pocket base surface (30) and a threaded bore (34) opening out thereto; and
    the two coolant ducts (60a, 60b) extend on either side of the threaded bore (34).

16. The cutting tool (20), according to claim 1, wherein the cutting tool (20) is configured to rotate in a direction of rotation (R) around the central tool axis (A);
    the tool body (24) comprises a forward facing body face surface (66) and a body periphery surface (68), the body periphery surface (68) extending circumferentially along the central tool axis (A) and forming a boundary of the body face surface (66) at a forward end of the cutting tool (20); and
    the coolant chamber opening (46) is located rotationally behind the insert pocket (28).

17. The cutting tool (20), according to claim 16, wherein the coolant chamber opening (46) and the insert pocket (28) are aligned in the circumferential direction of the cutting tool (20).

18. The cutting tool (20), according to claim 1, wherein the cutting tool (20) is configured to rotate in a direction of rotation (R) around the central tool axis (A);
    the tool body (24) comprises a forward facing body face surface (66) and a body periphery surface (68), the body periphery surface (68) extending circumferentially along the central tool axis (A) and forming a boundary of the body face surface (66) at a forward end of the cutting tool (20);
    the insert pocket (28) opens out to the body face surface (66); and the coolant chamber opening (46) is angularly aligned with the insert pocket (28) about the central tool axis (A).

19. The cutting tool (20), according to claim 16, wherein the cutting tool (20) is a rotary milling cutter.

20. A cutting tool (20) having a central tool axis (A) extending in a forward direction ($D_F$) to a rearward direction ($D_R$), the cutting tool comprising:
  a tool body (24) comprising a tool body surface (26) and an insert pocket (28) recessed therein; and
  a cutting insert (22) releasably retained in the insert pocket (28), wherein:
    the tool body (24) comprises:
      a coolant chamber (44) that opens out to the tool body surface (26) at a coolant chamber opening (46);
      at least one coolant duct (60a, 60b) that opens out at an outlet orifice (56) in the coolant chamber (44);
      the coolant chamber (44) is bounded on a side opposite the outlet orifice (56) by a coolant deflection portion (58) that is integrally formed with the tool body (24) in a unitary one-piece construction; and
      in a front view of the coolant chamber (44), the outlet orifice (56) is at least partially hidden by the coolant deflection portion (58).

21. A tool body (24) comprising a tool body surface (26) and an insert pocket (28) for seating of a cutting insert (22), recessed therein; wherein:
  the tool body (24) comprises:
    a coolant chamber (44) that opens out to the tool body surface (26) at a coolant chamber opening (46); and
    at least one coolant duct (60a, 60b) that opens out at an outlet orifice (56) in the coolant chamber (44); wherein:
      the coolant chamber (44) is bounded on a side opposite the outlet orifice (56) by a coolant deflection portion (58) that is integrally formed with the tool body (24) in a unitary one-piece construction and at least partially overhangs the outlet orifice (56) in a direction towards the insert pocket (28).

22. The tool body (24), according to claim 21, wherein the coolant chamber opening (46) is elongated and non-circular.

23. A cutting tool (20) having a central tool axis (A) extending in a forward direction ($D_F$) to a rearward direction ($D_R$), the cutting tool (20) comprising:
  the tool body (24) of claim 22; and
  a cutting insert (22) seated in the insert pocket (28) of the tool body (24).

24. The cutting tool (20) according to claim 23, wherein:
  the cutting insert (22) has a cutting edge (38) which extends along the tool central axis (A) in the forward-to-rearward direction;
  the coolant chamber opening (46) extends longitudinally generally in the same direction as the cutting edge (38); and
  the coolant chamber opening (46) is positioned, relative to the insert pocket (28), so as to direct a coolant over and along a relief surface associated with the cutting edge (38) such that the coolant impacts a juncture between the cutting edge (38) and a workpiece being cut by the cutting tool (20).

25. A method of delivering coolant during a cutting operation, comprising:
  providing the cutting tool according to claim 23, and
  emitting an elongated sheet of coolant through the coolant chamber opening (46), such that the coolant travels over and along a relief surface of the cutting insert (22) and impacts at a juncture between a cutting edge (38) of the cutting insert (22) and a workpiece.

\* \* \* \* \*